United States Patent
Zehler et al.

(10) Patent No.: US 9,729,735 B2
(45) Date of Patent: Aug. 8, 2017

(54) INTELLIGENT PRE-CONVERSION OF DOCUMENT FORMATS FOR PREDICTED PRINTER SELECTION

(71) Applicant: Xerox Corporation, Norwalk, CT (US)

(72) Inventors: Peter J. Zehler, Penfield, NY (US); Jeremy L. Reitz, Marion, NY (US); Emil Macarie, Rochester, NY (US); Lawrence W. Meyer, Fairport, NY (US); Edgar Braeunle, Rush, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 14/832,051

(22) Filed: Aug. 21, 2015

(65) Prior Publication Data

US 2017/0054859 A1 Feb. 23, 2017

(51) Int. Cl.
*G06F 3/12* (2006.01)
*H04N 1/00* (2006.01)

(52) U.S. Cl.
CPC ....... *H04N 1/00244* (2013.01); *G06F 3/1204* (2013.01); *G06F 3/126* (2013.01); *G06F 3/1226* (2013.01); *G06F 3/1247* (2013.01); *G06F 3/1267* (2013.01); *G06F 3/1268* (2013.01); *G06F 3/1273* (2013.01); *G06F 3/1291* (2013.01); *H04N 1/0023* (2013.01); *H04N 1/00204* (2013.01); *H04N 1/00411* (2013.01); *H04N 2201/0094* (2013.01)

(58) Field of Classification Search
None
See application file for complete search history.

(56) References Cited

U.S. PATENT DOCUMENTS

| | | | |
|---|---|---|---|
| 8,330,980 B2 | 12/2012 | Sorrentino et al. | |
| 8,441,660 B2 | 5/2013 | Salgado | |
| 8,537,392 B2 | 9/2013 | d'Entrecasteaux | |
| 8,559,033 B2 | 10/2013 | Kohli et al. | |
| 8,773,689 B2 | 7/2014 | Kohli et al. | |
| 2003/0016388 A1* | 1/2003 | Christodoulou | G06F 3/1204 358/1.15 |
| 2004/0148335 A1* | 7/2004 | Keeney | G06F 3/1204 709/201 |
| 2008/0158581 A1* | 7/2008 | Ferlitsch | G06F 3/1206 358/1.13 |
| 2011/0299120 A1* | 12/2011 | Sekine | G06F 3/1221 358/1.15 |

(Continued)

*Primary Examiner* — John Wallace
(74) *Attorney, Agent, or Firm* — Fox Rothschild LLP

(57) ABSTRACT

A method for pre-rendering a print job to a print-ready document format in a print system comprising a plurality of print devices. The method may include receiving a print job from a user via a mobile electronic device and predicting at least one print device in the print system that the user may use for printing the print job. The prediction is based on at least one of the following: user activity data relating to printing in the print system by the user, print device information relating to the plurality of print devices, user information received from the mobile electronic device, or a plurality of print job criteria provided by the user. The method may further include recommending at least one print-ready document format that the at least one print device may use for printing the print job, and pre-rendering the print job to the recommended at least one print-ready document format.

18 Claims, 3 Drawing Sheets

(56) References Cited

U.S. PATENT DOCUMENTS

| | | | | |
|---|---|---|---|---|
| 2011/0321058 A1* | 12/2011 | Schmidt | ............... | G06F 9/5083 |
| | | | | 718/105 |
| 2013/0094048 A1* | 4/2013 | Sako | ................. | G06F 3/1222 |
| | | | | 358/1.14 |
| 2014/0104650 A1* | 4/2014 | Cogan | ................. | G06F 3/1212 |
| | | | | 358/1.15 |
| 2014/0293325 A1* | 10/2014 | Haapanen | ............ | G06F 3/1268 |
| | | | | 358/1.15 |
| 2015/0154482 A1* | 6/2015 | Kawai | ............... | H04N 1/00307 |
| | | | | 358/1.15 |

\* cited by examiner

INTELLIGENT PRE-CONVERSION OF DOCUMENT FORMATS FOR PREDICTED PRINTER SELECTION

BACKGROUND

A common mode of printing in a networked environment requires a user to select a preferred network printer to which a print request will be sent, often without knowledge of how many requests or pages may be positioned in a queue ahead of their request or whether resources may be needed at that particular printer. Such a situation can cause unnecessary delays and multiple requests for the same document, resulting in wasted resources, especially in networked environments where printers are located in another room or even on another floor from where the user is located.

A solution to this problem involves the implementation of a system in which a user can walk to any printer in the network pool and request that his or her job be released and printed at that particular printer. This "walk and request" mode of printing is the basis of what is sometimes referred to as "pull printing" or related technologies such as those marketed under the trademark FOLLOWME®. Current technology enabling pull printing however may still lead to a perceptible delay in printing that occurs once the user at a supported printer selects a job to be printed. One reason for this delay is that the user's submitted source document must first be converted by the applicable print server to a print ready document (i.e., in a format compatible to the selected printer), and then only sent to the printer selected by the user. This forces the user to select the correct print format when submitting the print job for printing, but because the user may not know from which printer the job will be actually printed, the user will not have a way of knowing ahead of time which printer format to select.

This problem may be exacerbated for portable electronic devices that have limited computing capacity and correspondingly limited functionality. For example, some portable mobile devices may include enough memory to store a specific number of documents, but may not be able to execute larger applications that are necessary to render the stored documents into a format that is compatible with a particular printer for printing.

The current disclosure discloses a system and method to automatically predict a networked printer a user will use in a pull printing mode, and pre-convert a print job to a format compatible with the predicted networked printer to avoid printing delays.

SUMMARY

A method (and system) for pre-rendering a print job to a print-ready document format in a print system comprising a plurality of print devices is disclosed. In an embodiment, the method may include receiving a print job from a mobile electronic device of a user via a communications network by a print server, and generating a prediction of at least one candidate print device in the print system that may be selected for printing the print job. Generating the prediction may include accessing a data set of print history for the user, determining, from the print history, one or more print devices that the user has used in a time interval, and selecting one or more of the print devices from the time interval as the at least one candidate print device for the prediction. The method may also include, by the print server, accessing a data set of print device data corresponding to one or more of the candidate print devices to identify one or more print-ready document formats that one or more of the candidate print devices are capable of using for printing the print job, and pre-rendering the print job to the identified one or more print-ready document formats. In an embodiment, the data set of print device data corresponding to one or more of the candidate print devices may include at least one of the following: data corresponding to print device capabilities of one or more of the candidate print devices, information relating to existing print job queues for each of the candidate print devices, a print device location for each of the plurality of print devices, or current configuration status for each of the plurality of print devices.

In an embodiment, the method may also include by the print server: receiving, from the mobile electronic device, a selection of one of the candidate print devices; and transmitting the print job in a print-ready document format selected to the selected print device for printing.

In at least one embodiment, selecting one or more of the print devices from the time interval as the at least one candidate print device for the prediction may include determining one or more print job criteria for the print job, accessing a set of print device data corresponding to the plurality of print devices to identify one or more print devices having print device information that matches the one or more print job criteria, and only selecting a print device as a candidate print device if the print device has print device information that matches the one or more print job criteria. Alternatively and/or additionally, selecting one or more of the print devices from the time interval as the at least one candidate print device for the may also include using time history data in the print history for the user to predict a time of printing for the received print job; identifying a print device that does not have an existing print job queued at the predicted time; and selecting the print device that does not have an existing print job queued at the predicted time as a candidate device.

In some embodiments, identifying the one or more print-ready document formats may include selecting a print-ready document format based on at least one of the following: a complexity level for conversion of the print job to the print-ready document format, an estimated processing time for conversion of the print job to the print-ready document format, an estimated consumption of resources for conversion of the print job to the print-ready document format, a number of predicted print devices compatible with the print-ready document format, the data set of print history for the user, or a plurality of print job criteria provided by the user.

In an embodiment, the method may also include prioritizing the one or more print-ready document formats, based on at least one of the following: the data set of print device data corresponding to one or more of the candidate print devices, a complexity level for conversion of the print job to each of the candidate print-ready document formats, an estimated processing time for conversion of the print job to each of the candidate print-ready document formats, an estimated consumption of resources for conversion of the print job to each of the candidate print-ready document formats, a number of predicted print devices compatible with each of the candidate print-ready document formats, print device utilization statistics for each of the candidate of print devices for the user, information relating to existing print job queues for each of the candidate print devices, a print device location for each of the plurality of print devices, current configuration status for each of the plurality of print devices, the data set of print history for the user, or a plurality of print job criteria provided by the user.

In at least one embodiment, the method may include predicting an estimated time for pre-rendering the print job to the print-ready document format based on time history data in the print history for the user, wherein the time history data comprises a time between print job submission and printing of each of the plurality of past print jobs in the print history.

Additionally and/or alternatively the method may include predicting an estimated number of print-ready document formats based on print device utilization statistics for each of the plurality of candidate print devices.

In an embodiment, the method may include providing the user a print job retrieval code; and upon receiving and authenticating the print job retrieval code at a candidate print device, transmitting the pre-rendered print job to the selected print device.

DETAILED DESCRIPTION

Figure 1:
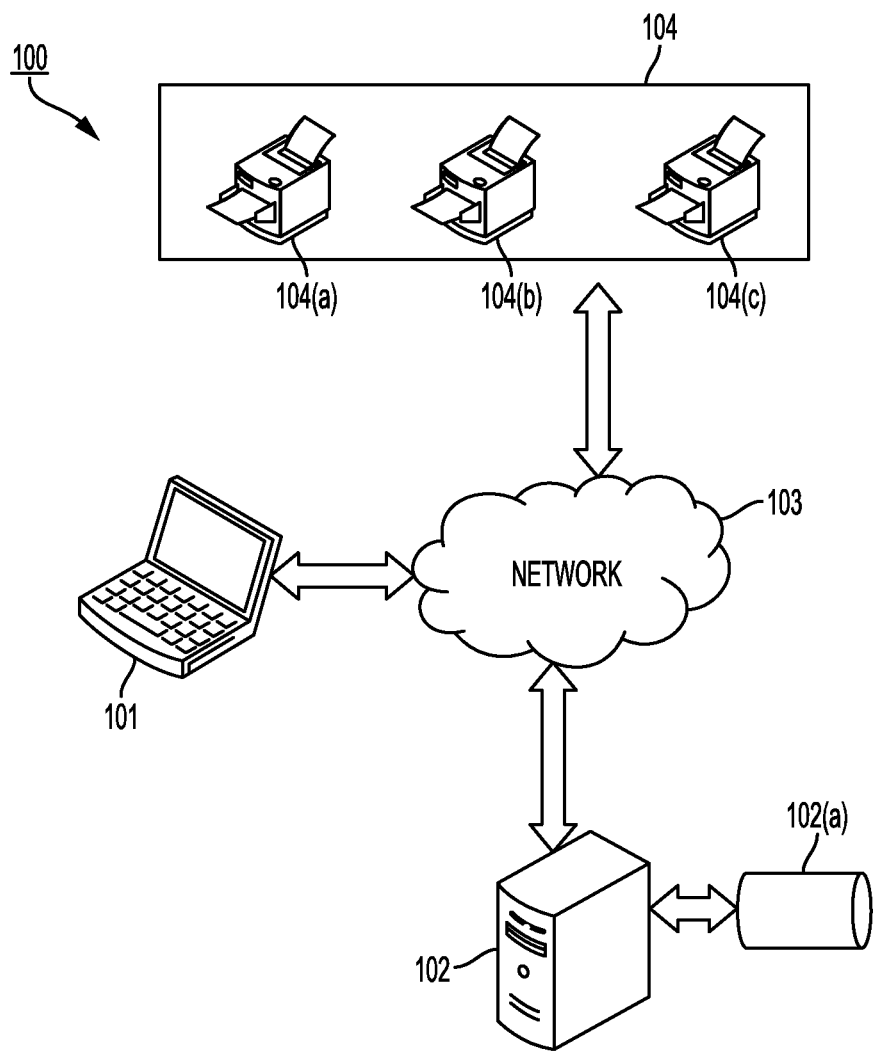
FIG. 1 is a schematic illustration of a print system for automatic pre-conversion of a print document to the predicted format, according to an embodiment.

This disclosure is not limited to the particular systems, methodologies or protocols described, as these may vary. The terminology used in this description is for the purpose of describing the particular versions or embodiments only, and is not intended to limit the scope.

As used in this document, any word in singular form, along with the singular forms "a," "an" and "the," include the plural reference unless the context clearly dictates otherwise. Unless defined otherwise, all technical and scientific terms used in this document have the same meanings as commonly understood by one of ordinary skill in the art. All publications mentioned in this document are incorporated by reference. Nothing in this document is to be construed as an admission that the embodiments described in this document are not entitled to antedate such disclosure by virtue of prior invention. As used in this document, the term "comprising" means "including, but not limited to."

A "mobile device" or "mobile electronic device" refers to a portable computing device that includes, a processor and non-transitory, computer-readable memory. The memory may contain programming instructions in the form of a software application that, when executed by the processor, causes the device to perform one or more print document formatting operations. Examples of suitable portable electronic devices include smartphones, personal digital assistants, cameras, tablet devices, electronic readers, personal computers, media players, satellite navigation devices and the like.

A "print device" refers to a device that includes a print engine for printing a document. The print device may also include a near field communication (NFC) interface used to communicate with one or more other devices, a processor that can process the document and a memory unit for storage of the documents or portions of the document. Any suitable print device can be used including, but not limited to, inkjet and laser print devices and multifunction devices.

The term "document" refers to a set of content that provides information, the writing including characters (i.e., text, numbers and/or symbols) and/or images. The term "document" may include an electronic document file, a Web page, a newsgroup posting, a picture, media, hyperlinks, etc. The document may, for example, include one or more areas comprising characters, and one or more other areas consisting of images. The characters, for example, may include narrative text sections of some length, as well as titles and captions.

A "multi-functional device" or "MFD", as used herein, refers to a machine comprising hardware and associated software configured for printing, as well as at least one other function such as copying, facsimile transmitting or receiving, scanning, or performing other actions on document-based data. An MFD is a type of print device.

The term "formatting" and/or "rendering" a print job for printing refers to taking a data set for the print job, such as text, images, and formatting, and converting them into a format that is compatible with the destination printer (for printing). Rendering may include various language or format conversions that are performed on a print job data set before that data is ready for use by the print device. Examples of "rendering" may include, without limitation, converting an application file or other data into a page description language (PDL)-formatted print job; converting the PDL data through any number of additional intermediate language or format conversions, for example a display list; and rasterizing the print job data. The term "pre-rendering" refers to rendering a print job data for printing in a print-ready document format before the selection of a print device for printing the document.

While the current disclosure refers to pre-rendering a document for printing, it will be understood to those skilled in the art that the principles of this disclosure may be similarly applied to automatically formatting and/or rendering documents for other devices such as scanners, fax machines, copiers, and other such devices.

The term "pull printing" refers to a situation when a user submits a print job that it is held somewhere instead of being immediately sent to a user-pre-designated print device. The user then may go to any print device in the network that is part of printing and call the print job to that print device for printing.

FIG. 1 is a block diagram of a print system 100 for pull printing adapted to automatically pre-render a print job for users of mobile devices 101 printing documents on print device 104 (including print devices 104(a), 104(b), 104(c), and so on), or other network devices such as MFDs (not shown here), of the system 100. The print system 100 may include one or more mobile devices 101 and one or more print devices 104 coupled electronically through a network 103. A network may include connections such as wire, wireless communication links, or fiber optic cables, and may provide any suitable medium of communication such as WiFi, Bluetooth, Ethernet, Internet, etc.

It will be understood to those skilled in the art that while the current disclosure describes transmitting print documents from mobile devices, similar principles can be applied to, printing documents from other computing devices, such as desktop computers, print servers, etc., without deviating from the principles of this disclosure.

The print system 100 may also include a print server 102 and a pre-conversion subsystem 102(a), in communication with the mobile device 101 and/or the print devices 104, via the network 103. In an embodiment, the pre-conversion subsystem may be a part of the print server. The print server and pre-conversion subsystem may be implemented on or as a web site, a server on a private network or local intranet, or other local or remote hardware, software, or logic. The print server may receive and store a print job submitted by a user, via the mobile device, till the time a user selects a print device for printing the submitted print job. The print server may allow a set of users to print at a number of print devices. The print server and pre-conversion subsystem may provide print services for the mobile device to format and render documents to be printed. The print server may render a print document submitted by a user into a print device compatible format using the pre-conversion subsystem before or after the user has selected the print device.

In an embodiment, the pre-conversion subsystem may store data and associated metadata associated with a user (and/or associated mobile device) and the print devices. Alternatively and/or additionally, the pre-conversion subsystem may be configured to access and/or retrieve data and metadata associated with a user and the print devices from a remote server.

Each of the print devices may include a user interface (not shown here), which may be employed to select features and enter other data to, for example, the print device. Such a user interface may include, for example, a touch screen having touch activated keys for navigating through an option menu or the like. In certain embodiment, the print device may include means for user authentication. The print device, for example, may be connected to an external user authentication system, such as a smart card reader, or may be configured to include internal user identification.

Figure 2:
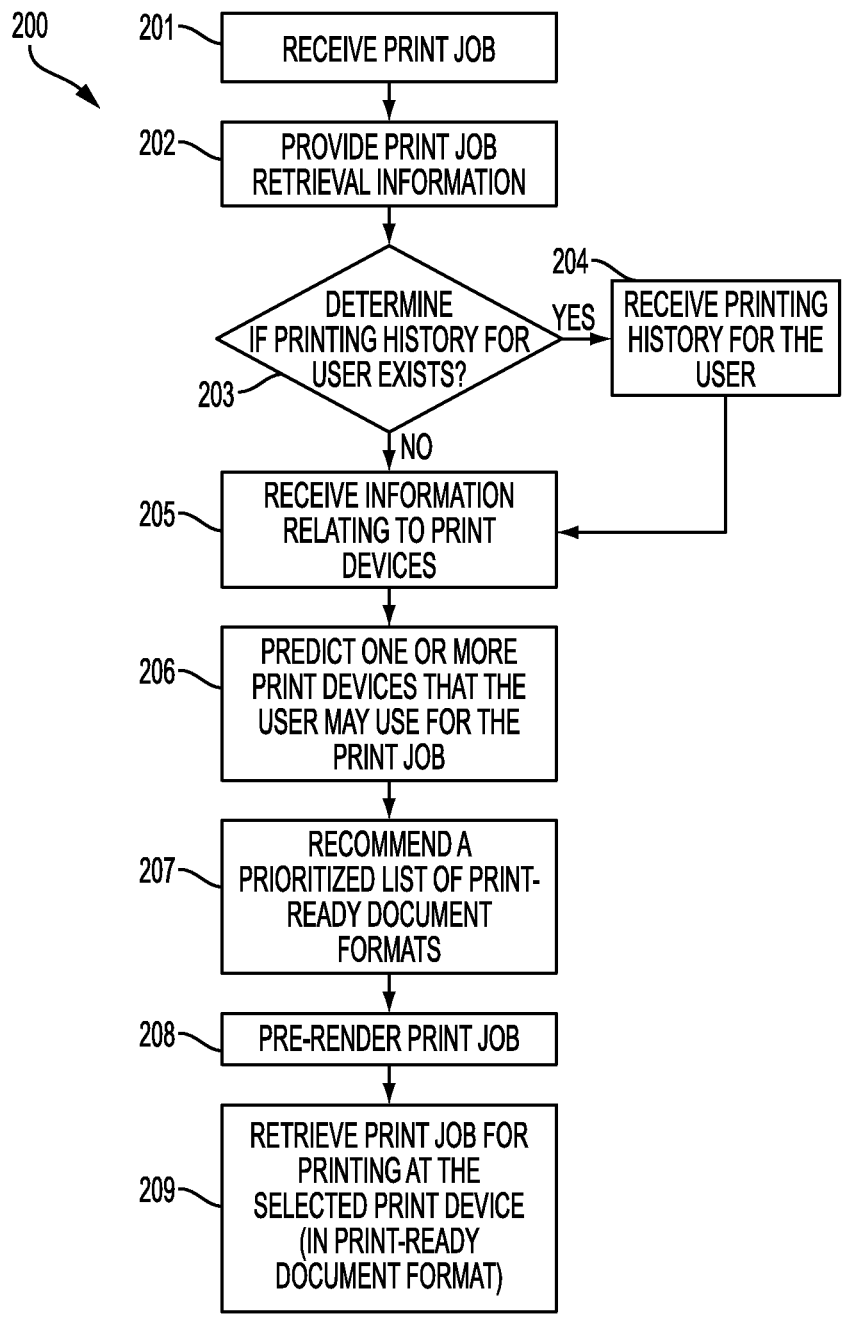
FIG. 2 depicts a flow chart example for predicting a networked printer a user may use, and pre-converting a print document to the predicted format, according to an embodiment.

FIG. 2 depicts a flow chart example of a process for automatically pre-rendering a print job document into a format compatible to a print device the user may use to print the document, according to an embodiment.

A print application may be installed on the mobile device for submitting print jobs to the print server. In this document, the terms "print application" and "print software" refer to a software application that is configured to cause an electronic device to perform some or all of the document rendering, print device selection, and/or printing functions that are described in this disclosure. The print device and/or the mobile device may have a print application pre-configured. Alternatively and/or additionally, a user of print device and/or the mobile device may download and install a print application onto the mobile device. The user may acquire the application by downloading it from an application store or from a print service provider. The print application may include virtually any application type which may run on any underlying operating system or platform. The installed print application may register itself with the mobile operating system allowing the application to monitor certain activities on the mobile operating system, and using the functionalities of the operating system.

The print application may correspond to a local application which executes on the mobile device. Alternatively, the print application may represent a web application which executes on a remote application server. That is, the print application may include any application functionality which is accessed by the user over a network and experienced locally as application e.g., using a browser running on the mobile device. The print application may include a database of information. In certain embodiments, the database may be exported to another local device or to a remote, cloud-based repository. Techniques for executing such a web application, and related technology, are well known in the art and are therefore not described further in detail herein, except as may be helpful or necessary to understand operations of the system.

In step 201, a print server may receive a print job after the user's mobile device submits the print job, via the print application, to the print sever. The print application may initially authenticate the mobile device and/or the user to ensure security of transmission, as well as to link the mobile device and/or the user with the print job. For example, the print application may prompt the user to enter username and/or password upon launch. In certain embodiments, the above authentication information may be stored by the print application to a database for future use. The print application may transmit the user authentication information to the print server with the print job. Additionally and/or optionally, the print application may also retrieve other information related to the user from the mobile device, such as location of the user, preferred language settings, calendar entries, user access credentials to each of the printers in the print system etc., and transmit the retrieved information to the print server.

In an embodiment, a print job may include one or more files or documents to be printed at a print device. The print job may also include user-defined print criteria for the print job. Example of print criteria may include, without limitation, the desired number of copies, estimated time of printing, resolution of the print job, speed of printing, duplex printing or single-sided printing, size of the print documents, quality of print paper, finishing requirements, collating requirements, print quality, printer location, and whether the image should be in black-and-white or in color. For example, the customer may desire that the document be printed on letter size paper in full color in the double-sided printing mode in the amount of 100 copies. In an embodiment, the user may rank the print criteria based on user preference. In certain other embodiments, the print server may store the user's preferences for future reference.

Additionally and/or optionally, the print server may also detect print criteria from the print job itself. For example, the print server may infer the size and thickness of the print paper based on the types of documents in the print job (such as business cards, posters, invitation cards, etc.).

In step 202, the print application may provide the user with print job retrieval information to enable the user to print the print job at a print device in the print system. Print job retrieval information may include, without limitation, a PIN, a password, or other such information.

Upon receipt of the print job, print server may forward the print job and the user information to the pre-conversion subsystem. In step 203, the pre-conversion subsystem may use the user information to determine if printing history exists for the user. If printing history exists for the user, the pre-conversion subsystem may retrieve 204 a list of print devices and/or other metadata that the user has used in the past to print documents. If printing history does not exist for the user, the pre-conversion subsystem may consider other factors, as discussed later, to predict one or more print devices that the user may use for printing the print job. In an embodiment, printing history for a user may include, without limitation, a list of print devices in the print system used by the user in the past, and/or additional metadata for the user corresponding to the print devices. Examples of the additional metadata may include, without limitation, frequency of print device usage. correlation of print device usage frequency with user location for each of the past print jobs, types of documents printed at each of the print devices, past user-defined print criteria for each of the print devices, time lapse submission between print job submission and printing for each of the print devices, and other similar information.

The pre-conversion subsystem may update the printing history related to the user every time a user uses a print device in the print system. In certain other embodiments, the pre-conversion subsystem may update the printing history related to the user at certain time intervals, after certain number of print attempts, or other similar events.

In an embodiment, the pre-conversion subsystem may also retrieve 205 information relating to various print devices in the print system from one or more databases associated with the print server, and/or one or more remote databases. Information relating to the various print device may include, without limitation, print device capabilities, existing print job queues at each of the print devices, current configuration status, and other such information.

In step 206, the pre-conversion subsystem may access the user's stored printing history and process the list of print devices in the printing history based on, without limitation the metadata from the printing history, print device related information, other user related information (such as location), and/or print job criteria, to predict one or more print devices that the user may use for printing the print job. For example, the system may use criteria from the print history such as identifying one or more print devices that user used in a recent time interval, used most frequently in a recent time interval, or used within a specified time interval to print a document having one or more criteria that match one or more criteria of the present print job. It may select one or more of such print devices for the prediction.

Any combination of criteria may be used. For example, if the user has used print devices A, B, and C in a selected past time interval to print documents, and a criterion of the current print job requires a printer characteristic (e.g., duplex color printing) which only print devices A and B can perform, then the pre-conversion subsystem may predict that the user may use print device A or B for printing the current print job. In yet another example, the pre-conversion subsystem may also use the user's current location and the print device location and/or match the user language settings to predict the print device that the user may use. Similarly, for predicting the print device(s) the user may use, the pre-conversion subsystem may use past user behavior, such as time lapse between print job submission and printing, to predict a time of printing, and choose printers that do not have another print job scheduled at the predicted time of printing. The system may require that more than one criterion be satisfied for a print device in order to include the device in the prediction.

In an embodiment, the user may specify one or more criteria to be used (and/or given weight) for predicting one or more print devices that the user may user for printing the print job. For example, the user may specify a location, a document size, a preference of speed vs. quality of printing, or other criteria.

In some embodiment, the pre-conversion subsystem may also rank the selected print devices using methods discussed below with respect to ranking the selected formats.

The pre-conversion subsystem may then analyze the print device capabilities of the predicted print devices of step 206, along with other factors (discussed below) to recommend 207 a prioritized list of one or more print-ready document formats that may be printed at a print device in the print system. In an embodiment, the format selection may be based on a data set of available print device parameters, and may be done using methods similar to those discussed above for the print device selection.

When presenting a list of one or more recommended print-ready formats to the print server, the system may rank (i.e., prioritize) the list according to any suitable ranking methodology. For example the system may assign a highest rank to those formats that meet the most criteria (or factors as discussed below), the lowest rank to those that meet the least criteria, and intermediate ranks to these in between based on the number of criteria that they meet. Alternatively, the system may assign weights to any or all of the criteria and adjust the ranking as a function such as a sum of each of the weighted criteria that a particular print-ready format meets.

Examples of factors that the pre-conversion subsystem may take into account for selecting and/or prioritizing one or more formats may include, without limitation, print device capabilities, printing history of the user, ranking of the print devices, number of print devices that support a document-ready format, print job criteria, complexity of conversion of the print document to a print-ready format, estimated processing times for estimated processing time for conversion of the submitted job into the recommended print-ready document formats, estimated consumption of resources for conversion of the submitted job into the recommended print-ready document formats, information relating to existing print job queues for each of the predicted print devices, a print device location for each of the predicted print devices, current configuration status for each of the predicted print devices, and other such factors.

For example, if more than one format may be supported by a majority of predicted print devices of step 206, the pre-conversion subsystem may recommend and/or prioritize the print-ready formats that correspond to the print job criteria such as preserving specific color scheme, margins, etc. Similarly, the formats supported by a print device closest to the user's location and capable of printing the print job may be selected and given priority over formats supported by print devices not in close proximity to the user.

Additionally and/or optionally, in an embodiment, the pre-conversion subsystem may use the list of print devices that the user may have used in the past to recommend and/or prioritize the print-ready formats. For example, if a user used print device A 20 times and print device B 10 times in the past, the pre-conversion subsystem may prioritize a print-ready document format that is compatible with print device A over a print-ready document format that is compatible with print device B.

As discussed above, in an embodiment, the pre-conversion subsystem may also use past user behavior, such as time lapse between print job submission and printing, to predict a time of printing, and recommend an estimated time by before which the pre-rendering must be completed.

In some embodiments, the time lapse between past print job submission and printing may also be used to prioritize document conversions or to limit the number of conversions for a user's print job. As used herein, the number of conversions refers to the number of different print ready formats the pre-conversion subsystem may recommend that the print server and/or the print application may pre-render the print job into. In an embodiment, the current load on the system and/or the recommended print devices may be used as a factor to limit the number of conversions performed for each document or for the prioritization of the order of conversions.

In an embodiment, the pre-conversion subsystem may recommend a format that may be supported by all the predicted print devices of step 206. Alternatively and/or additionally, the pre-conversion subsystem may recommend a format that may be supported by a majority of predicted print devices of step 205. In another embodiment, the pre-conversion subsystem may recommend more than one formats such that all the predicted print devices may be able to print the print job in a print-ready format, and prioritize the formats.

In step 208, the print server and/or the print application may pre-render the print job in the format(s) recommended by the pre-conversion subsystem (i.e., convert the submitted print job to a print-ready format). Optionally, this pre-rendering may be done automatically, without the requirement for user action, before the user selects a recommended print device. If a time estimate (and/or number of copies) for finishing the pre-rendering process is provided, the print server and/or the print application may take the time estimate into account for performing the pre-rendering of the print job. In an embodiment, the pre-rendered print job may only be sent to the print device when the user releases the print job at the selected print device.

The user may then select 209 a print device to release the selected print jobs for printing. In an embodiment, the user may select the print device by logging into the print device using existing methods such as by providing user credentials at a user interface of the print device, swiping a user identification card, close proximity protocol interaction (i.e., pairing), near field protocol interaction (i.e., tap), and other similar methods. In an embodiment, the user may use the print job retrieval information (such as PIN, password, etc.) from step 202 to retrieve the print job at the selected print device. In certain other embodiments, the user may automatically retrieve the print job at the selected print device by establishing a short range communications link between the mobile device and the print device, using near-field communication (NFC) or other related technology, wherein the print application may automatically transmit the retrieval information.

It will be understood to those skilled in the art that while the above disclosure describes pre-rendering of print jobs in a print system for 2-D printing, similar principles can be applied to 3-D printing (such as using a 3-D printer to print a 3-D object), without deviating from the principles of this disclosure.

Figure 3:
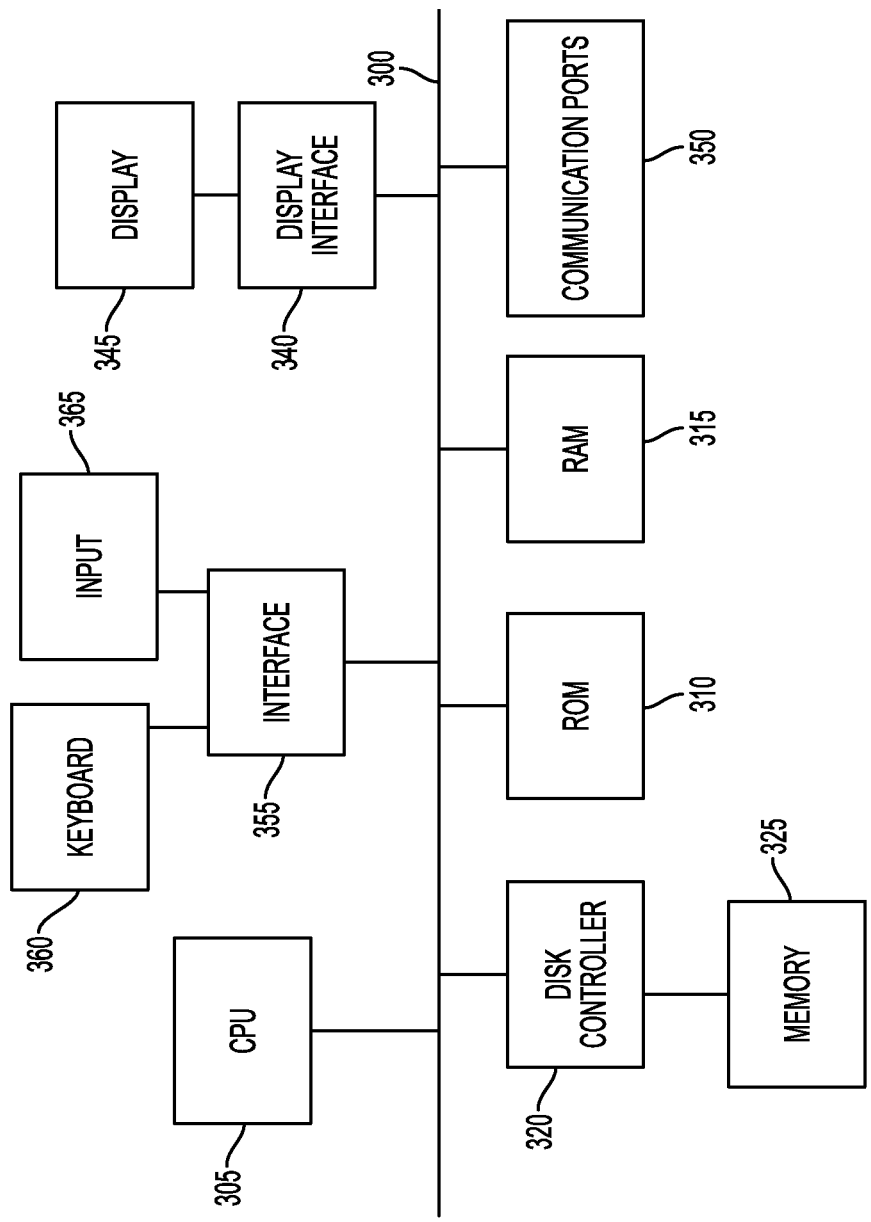
FIG. 3 depicts various embodiments of a mobile device for using the systems and processes described in this document.

The network access discovery method and process as described above may be performed and implemented by an operator of a mobile electronic device and/or a print device. FIG. 3 depicts an example of internal hardware that may be used to contain or implement the various computer processes and systems as discussed above. For example, the mobile electronic device discussed above may include hardware such as that illustrated in FIG. 3. An electrical bus 300 serves as an information highway interconnecting the other illustrated components of the hardware. CPU 305 is a central processing unit of the system, performing calculations and logic operations required to execute a program. CPU 305, alone or in conjunction with one or more of the other elements, is a processing device, computing device or processor as such terms are used within this disclosure. A CPU or "processor" is a component of an electronic device that executes programming instructions. The term "processor" may refer to either a single processor or to multiple processors that together implement various steps of a process. Unless the context specifically states that a single processor is required or that multiple processors are required, the term "processor" includes both the singular and plural embodiments. Read only memory (ROM) 310 and random access memory (RAM) 315 constitute examples of memory devices. The term "memory device" and similar terms include single device embodiments, multiple devices that together store programming or data, or individual sectors of such devices.

A controller 320 interfaces with one or more optional memory devices 325 that service as date storage facilities to the system bus 300. These memory devices 325 may include, for example, an external or internal disk drive, a hard drive, flash memory, a USB drive or another type of device that serves as a data storage facility. As indicated previously, these various drives and controllers are optional devices. Additionally, the memory devices 325 may be configured to include individual files for storing any software modules or instructions, auxiliary data, incident data, common files for storing groups of contingency tables and/or regression models, or one or more databases for storing the information as discussed above.

Program instructions, software or interactive modules for performing any of the functional steps associated with the processes as described above may be stored in the ROM 310 and/or the RAM 315. Optionally, the program instructions may be stored on a non-transitory, computer readable medium such as a compact disk, a digital disk, flash memory, a memory card, a USB drive, an optical disc storage medium, and/or other recording medium.

An optional display interface 340 may permit information from the bus 300 to be displayed on the display 345 in audio, visual, graphic or alphanumeric format. Communication with external devices may occur using various communication ports 350. A communication port 350 may be attached to a communications network, such as the Internet, a local area network or a cellular telephone data network.

The hardware may also include an interface 355 which allows for receipt of data from input devices such as an imaging sensor 360 of a scanner or other input device 365 such as a keyboard, a mouse, a joystick, a touchscreen, a remote control, a pointing device, a video input device and/or an audio input device.

The above-disclosed features and functions, as well as alternatives, may be combined into many other different systems or applications. Various presently unforeseen or unanticipated alternatives, modifications, variations or improvements may be made by those skilled in the art, each of which is also intended to be encompassed by the disclosed embodiments.

The invention claimed is:

1. A method for pre-rendering a print job to a print-ready document format in a print system comprising a plurality of print devices, the method comprising:
    by a print server, receiving a print job from a mobile electronic device of a user via a communications network;
    by the print server, generating a prediction of at least one candidate print device in the print system that may be selected for printing the print job by:
        accessing a data set of print history for the user,
        determining, from the print history, one or more print devices that the user has used in a time interval, and
        selecting one or more of the print devices from the time interval as the at least one candidate print device for the prediction;
    by the print server, accessing a data set of print device data corresponding to one or more of the candidate print devices to identify one or more print-ready document formats that one or more of the candidate print devices are capable of using for printing the print job;

predicting an estimated number of print-ready document formats based on:
- an estimated time of printing determined using time history data in the print history for the user, wherein the time history data comprises a time between print job submission and printing of each of the plurality of past print jobs in the print history, and
- print load for each of the plurality of candidate print devices at the estimated time of printing; and by the print server, pre-rendering the print job to the identified one or more print-ready document formats before receiving an identification of a print device to be used for printing the print job.

2. The method of claim 1, further comprising, by the print server:
- receiving, from the mobile electronic device, a selection of one of the candidate print devices; and
- transmitting the print job in a print-ready document format selected to the selected print device for printing.

3. The method of claim 1, wherein selecting one or more of the print devices from the time interval as the at least one candidate print device for the prediction comprises:
- determining one or more print job criteria for the print job;
- accessing a set of print device data corresponding to the plurality of print devices to identify one or more print devices having print device information that matches the one or more print job criteria; and
- only selecting a print device as a candidate print device if the print device has print device information that matches the one or more print job criteria.

4. The method of claim 1, wherein the data set of print device data corresponding to one or more of the candidate print devices comprises at least one of the following:
- data corresponding to print device capabilities of one or more of the candidate print devices,
- information relating to existing print job queues for each of the candidate print devices,
- a print device location for each of the plurality of print devices, or
- current configuration status for each of the plurality of print devices.

5. The method of claim 1, wherein selecting one or more of the print devices from the time interval as the at least one candidate print device for the prediction also comprises:
- using time history data in the print history for the user to predict a time of printing for the received print job;
- identifying a print device that does not have an existing print job queued at the predicted time; and
- selecting the print device that does not have an existing print job queued at the predicted time as a candidate device.

6. The method of claim 1, wherein identifying the one or more print-ready document formats comprises selecting a print-ready document format based on at least one of the following:
- a complexity level for conversion of the print job to the print-ready document format;
- an estimated processing time for conversion of the print job to the print-ready document format;
- an estimated consumption of resources for conversion of the print job to the print-ready document format;
- a number of predicted print devices compatible with the print-ready document format;
- the data set of print history for the user; or
- a plurality of print job criteria provided by the user.

7. The method of claim 1, further comprising prioritizing the one or more print-ready document formats, based on at least one of the following:
- the data set of print device data corresponding to one or more of the candidate print devices;
- a complexity level for conversion of the print job to each of the candidate print-ready document formats;
- an estimated processing time for conversion of the print job to each of the candidate print-ready document formats;
- an estimated consumption of resources for conversion of the print job to each of the candidate print-ready document formats;
- a number of predicted print devices compatible with each of the candidate print-ready document formats;
- print device utilization statistics for each of the candidate of print devices for the user;
- information relating to existing print job queues for each of the candidate print devices;
- a print device location for each of the plurality of print devices;
- current configuration status for each of the plurality of print devices;
- the data set of print history for the user; or
- a plurality of print job criteria provided by the user.

8. The method of claim 1, further comprising predicting an estimated time for pre-rendering the print job to the print-ready document format based on the time history data in the print history for the user.

9. The method of claim 1, further comprising:
- providing the user a print job retrieval code; and
- upon receiving and authenticating the print job retrieval code at a candidate print device, transmitting the pre-rendered print job to the selected print device.

10. A print system for pre-rendering a print job to a print-ready document format, the system comprising:
- a first data store containing a data set of print history for a plurality of users;
- a second data store containing a set of print device data for a plurality of print devices that are available to be used in a print system;
- a print server comprising one or more processors; and
- a computer-readable medium containing programming instructions that, when executed by the print server, cause the print server to:
  - receive a print job from a mobile electronic device of a first user via a communications network;
  - generate prediction of at least one candidate print device in the print system that may be selected for printing the print job by:
    - accessing a data set of print history for the first user in the first data store,
    - determine, from the print history for the first user, one or more print devices that the first user has used in a time interval, and
    - select one or more of the print devices from the time interval as the at least one candidate print device for the prediction;
  - accessing a data set of print device data, in the second data store, corresponding to one or more of the candidate print devices to identify one or more print-ready document formats that one or more of the candidate print devices are capable of using for printing the print job;
  - predict an estimated number of print-ready document formats based on:

an estimated time of printing determined using time history data in the print history for the user, wherein the time history data comprises a time between print job submission and printing of each of the plurality of past print jobs in the print history, and print load for each of the plurality of candidate print devices at the estimated time of printing; and pre-render the print job to the identified one or more print-ready document formats before receiving an identification of a print device to be used for printing the print job.

11. The print system of claim 10, further comprising programming instructions that, when executed by the print server, cause the print server to:

receive, from the mobile electronic device, a selection of one of the candidate print devices; and transmit the print job in a print-ready document format selected to the selected print device for printing.

12. The print system of claim 10, wherein programming instructions that, when executed by the print server, cause the print server to select one or more of the print devices from the time interval as the at least one candidate print device for the prediction further comprise programming instructions that cause the print server to:

determine one or more print job criteria for the print job;

access a set of print device data corresponding to the plurality of print devices to identify one or more print devices having print device information that matches the one or more print job criteria; and only select a print device as a candidate print device if the print device has print device information that matches the one or more print job criteria.

13. The print system of claim 10, wherein the data set of print device data corresponding to one or more of the candidate print devices comprises at least one of the following:

data corresponding to print device capabilities of one or more of the candidate print devices, information relating to existing print job queues for each of the candidate print devices, a print device location for each of the plurality of print devices, or current configuration status for each of the plurality of print devices.

14. The print system of claim 10, wherein programming instructions that, when executed by the print server, cause the print server to select one or more of the print devices from the time interval as the at least one candidate print device for the prediction further comprise programming instructions that cause the print server to:

use time history data in the print history for the user to predict a time of printing for the received print job;

identify a print device that does not have an existing print job queued at the predicted time; and select the print device that does not have an existing print job queued at the predicted time as a candidate device.

15. The print system of claim 10, wherein programming instructions that, when executed by the print server, cause the print server to identifying the one or more print-ready document formats comprise print instructions that cause the print server to select a print-ready document format based on at least one of the following:

a complexity level for conversion of the print job to the print-ready document format;

an estimated processing time for conversion of the print job to the print-ready document format;

an estimated consumption of resources for conversion of the print job to the print-ready document format;

a number of predicted print devices compatible with the print-ready document format;

the data set of print history for the user; or a plurality of print job criteria provided by the user.

16. The print system of claim 10, further comprising programming instructions that, when executed by the print server, cause the print server to prioritize the one or more print-ready document formats, based on at least one of the following:

the data set of print device data corresponding to one or more of the candidate print devices;

a complexity level for conversion of the print job to each of the candidate print-ready document formats;

an estimated processing time for conversion of the print job to each of the candidate print-ready document formats;

an estimated consumption of resources for conversion of the print job to each of the candidate print-ready document formats;

a number of predicted print devices compatible with each of the candidate print-ready document formats;

print device utilization statistics for each of the candidate of print devices for the user;

information relating to existing print job queues for each of the candidate print devices;

a print device location for each of the plurality of print devices;

current configuration status for each of the plurality of print devices;

the data set of print history for the user; or a plurality of print job criteria provided by the user.

17. The print system of claim 10, further comprising programming instructions that, when executed by the print server, cause the print server to predict an estimated time for pre-rendering the print job to the print-ready document format based on the time history data in the print history for the user.

18. The print system of claim 10, further comprising programming instructions that, when executed by the print server, cause the print server to:

provide the user a print job retrieval code; and upon receiving and authenticating the print job retrieval code at a candidate print device, transmit the pre-rendered print job to the selected print device.

* * * * *